United States Patent
Lee et al.

(10) Patent No.: US 8,239,685 B2
(45) Date of Patent: Aug. 7, 2012

(54) BIOMETRIC AUTHENTICATION METHOD

(75) Inventors: Yong Jin Lee, Ansan-Si (KR); Yun Su Chung, Daejeon (KR); Ki Young Moon, Daejeon (KR)

(73) Assignee: Electronics and Telecommunications Research Institute, Daejeon (KE)

( * ) Notice: Subject to any disclaimer, the term of this patent is extended or adjusted under 35 U.S.C. 154(b) by 965 days.

(21) Appl. No.: 12/252,506

(22) Filed: Oct. 16, 2008

(65) Prior Publication Data

US 2009/0113209 A1     Apr. 30, 2009

(30) Foreign Application Priority Data

Oct. 24, 2007  (KR) .................. 10-2007-0107285
Aug. 13, 2008  (KR) .................. 10-2008-0079484

(51) Int. Cl.
*G06F 21/00* (2006.01)
(52) U.S. Cl. ........................ 713/186; 713/171
(58) Field of Classification Search .................. 713/186, 713/171
See application file for complete search history.

(56) References Cited

U.S. PATENT DOCUMENTS 7,120,607 B2 * 10/2006 Bolle et al. ................. 705/64
7,773,784 B2 *  8/2010 Boult ........................ 382/124

FOREIGN PATENT DOCUMENTS

JP    2007-108832     4/2007
KR   1020040000477    1/2004

OTHER PUBLICATIONS

Ueshige, "A Proposal of One-Time Biometric Authentication."*
Ueshige and Sakurai, "A Proposal of One-Time Biometric Authentication," 2006.*
Ueshige, Yoshifumi et al., "A Proposal of One-Time Biometric Authentication," retrieved online at http://ww1.ucmss.com/books/LFS/CSREA2006/SAM4361.pdf (2006).

* cited by examiner

*Primary Examiner* — Krista Zele
*Assistant Examiner* — Andrew Georgandellis
(74) *Attorney, Agent, or Firm* — Nelson Mullins Riley & Scarborough LLP; EuiHoon Lee, Esq.

(57) ABSTRACT

Provided is a biometric authentication method. A biometric authentication method in accordance with an aspect of the present invention includes generating a first one-time authentication template from biometric information using one-time transform information, and requesting authentication, comparing the first one-time authentication template with a one-time registration template, updating the one-time registration template and the one-time transform information when authentication is achieved according to a result of the comparison, wherein the updated one-time transform information is used to generate a second one-time authentication template to be authenticated according to the result of the comparison with the updated one-time registration template when successive authentication is requested.

19 Claims, 2 Drawing Sheets

BIOMETRIC AUTHENTICATION METHOD

CROSS-REFERENCE TO RELATED APPLICATIONS

This application claims priorities under 35 U.S.C. §119 to Korean Patent Application No. 10-2007-107285, filed on Oct. 24, 2007, and Korean Patent Application No. 10-2008-79484, filed on Aug. 13, 2008, the disclosure of which is incorporated herein by reference in their entirety.

BACKGROUND OF THE INVENTION

1. Field of the Invention

The present disclosure relates to a biometric authentication method, and more particularly, to a biometric authentication method which can enhance security.

This work was supported by the IT R&D program of MIC/ITA. [2007-S-020-01, Development of Privacy Enhanced Biometric System]

2. Description of the Related Art

Biometrics is a technology that proves an individual's identity using a user's physical/behavioral features. Examples of a biometric scheme using a physical feature include facial recognition, fingerprint recognition, iris recognition, etc, and examples of a biometric scheme using a behavioral feature include gait step recognition, signature recognition, etc. Generally, a biometric apparatus generates a template including the physical/behavioral features and uses the template for registering and identifying the user. A template which is registered and stored in the biometric apparatus is called a gallery or a registration template, and a template which is newly generated from a user upon authentication request is called a probe or an authentication template. User authentication compares the two templates and is achieved based on a comparison value generated through the comparison. For example, in a case where dissimilarity such as Euclidean distance is used as a comparison value, an authenticated user is classified as a genuine when the comparison value between two templates is less than a predetermined value, whereas the authenticated user is classified as an impostor when the comparison value between two templates is larger than a predetermined value. For another example, in a case where similarity such as a cosine function is used as a comparison value, an authenticated user is classified as a genuine when the comparison value between two templates is larger than a predetermined value, whereas the authenticated user is classified as an impostor when the comparison value between two templates is less than a predetermined value.

Since such biometric data include the unique information of each user, the privacy of each user can seriously be invaded when the biometric data is leaked and disclosed. Moreover, since the kind and number of data usable in biometrics are limited for each individual, for example each user has only one face and ten fingerprints, it is impossible to replace the lost data unless the each user undergoes a plastic surgery. Accordingly, once original data are leaked and stolen, damage due to this can be much larger than that of a case where a personal identification number is leaked.

Accordingly, in a case of data which are privacy-sensitive or important like biometric information, it is advised that encodes corresponding data using an encryption scheme. However, in a case of biometric data, although one and the same person's biometric information is obtained using the same device, it is impossible to get one and the same value every time. Moreover, although similar values are encrypted, the similar values are encrypted in different values due to the general characteristics of an encryption function. Ultimately, a comparison value, which is generated in a case where new input data are encrypted and the encrypted data are directly compared with data that are encrypted and registered in advance, are inconsistent with a comparison value generated in a case where an original type of data that are not encrypted are compared with each other. Accordingly, biometric authentication cannot directly use encrypted data for use authentication, and thus must decrypt encrypted data every time for comparison and authentication. That is, there is limitation in that a scheme of protecting an encrypted and registered template should decrypt the encrypted and registered template every time for data comparison and user-authentication, and consequently original data can be disclosed.

In particular, with advent of computer networks such as the Internet, important data are transmitted over the networks. Since the networks such as the Internet can easily be accessed by any user, critical vulnerability can occur in security. As an example, without hacking a client or a server directly, a personal identification number or a password is copied in the middle of being transmitted over the Internet and thereafter can be used to gain an illegal access to a server by retransmitting the copied data to a server. In this case, although secret information is encrypted, irrespective of whether original secret information is derived from the encrypted information, the encrypted secret information is copied and stored in the middle and thereafter is retransmitted as it is, thereby authenticating a user. Accordingly, in a case where data transmitted over a network are biometric information, as described above, vulnerability in security can be far more serious and threatening.

SUMMARY

Therefore, an object of the present invention is to provide a biometric authentication method which is capable of enhancing security.

An object of the present invention are not limited to the above-described objects, and another objects which are not described above can apparently be understood to those skilled in the art from the following description.

To achieve these and other advantages and in accordance with the purpose of the present invention as embodied and broadly described herein, a biometric authentication method in accordance with an aspect of the present invention includes: generating a first one-time authentication template from bio-information using one-time transform information, and requesting authentication; comparing the first one-time authentication template with a one-time registration template; updating the one-time registration template and the one-time transform information when authentication is achieved according to a result of the comparison, wherein the updated one-time transform information is used to generate a second one-time authentication template to be authenticated according to the result of the comparison with the updated one-time registration template when successive authentication is requested.

To achieve these and other advantages and in accordance with the purpose of the present invention, a biometric authentication method between a user, a client and a server in accordance with another aspect of the present invention includes: generating an original template from biometric information of the user, and transforming the original template with a first random orthogonal matrix and a first random vector provided from the user to generate a first one-time authentication template; comparing the first one-time authentication template with a one-time registration template prestored in the server, and authenticating according to a result of the comparison; updating the one-time registration template using a first one-time transform key prestored in the server, updating the first one-time transform key using a random key, and storing the updated one-time registration template and the updated first one-time transform key in the server; and updating the first random orthogonal matrix and the first random vector using the same second one-time transform key as the first one-time transform key, and updating the second one-time transform key identically to the updated first one-time transform key.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

Hereinafter, specific embodiments will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. In the present specification, the same reference numeral indicates like element. It will also be understood that the term "and/or" refers to and encompasses any and all possible combinations of one or more of the associated listed items.

A main object of the present invention is to provide a method which securely protects biometric information transmitted over an open network such as the Internet, and generates a new template for each user authentication so as to disallow user authentication using a template leaked or lost in the middle of being transmitted. For this, a method will firstly be described which transforms an original template generated from a user's biometric information into a secure form. One of the great advantages of a template protection method according to the present invention is that template matching for user authentication is performed in a transformed state without revealing original templates and a matching score does not change after transformation of templates. Accordingly, a template protection method of the present invention does not exert an evil influence on a recognition rate for protecting a template despite the transform of the original template.

Such characteristics will be described in more detail below. For convenience, an original template for registration generated from a user's biometric information is referred to as x, an original template for authentication is referred to as y, a one-time registration template registered in a authentication server or a authentication system after transformation is referred to as g, and a one-time authentication template for authentication after transformation is referred to as p. It is assumed that x, y, g and p are a real vector.

A random orthogonal matrix (A) and a random vector (b) are used in the transform of a template. An orthogonal matrix is a matrix having characteristics expressed as Equation (1) below.

$$A^T A = A A^T = I \qquad (1)$$

where I is an identity matrix having the same size as that of the random orthogonal matrix (A).

The one-time registration template (g) transformed from the original template (x) is expressed as Equation (2) below.

$$g = Ax + b \qquad (2)$$

The original template (x) is deleted after generating the one-time registration template (g), and the one-time registration template (g) is stored in the authentication system or the authentication server. Furthermore, the random orthogonal matrix (A) and the random vector (b) are stored as secret information in a personal storage device such as a smart card and is managed by a user. Without knowing the random orthogonal matrix (A) and the random vector (b), it is impossible to derive the original template (x) from the one-time registration template (g). Accordingly, although the authentication system or the authentication server is hacked, security can be enhanced because the original template (x) is not stolen.

To prove a user's identity, i.e., to request user authentication, the user provides biometric data, the random orthogonal matrix (A) and the random vector (b) to a client or a terminal. Then, the client or the terminal generates the original template (x) for authentication from the biometric data provided by the user. Furthermore, a template (p) is generated from an original template (y), the random orthogonal matrix (A) and the random vector (b) as expressed in Equation (3) below. At this point, the client or the terminal can delete the original template (y).

$$P = Ay + b \qquad (3)$$

The client or the terminal transmits the one-time authentication template (p) instead of the original template (y) to the authentication system or the authentication server. The authentication system or the authentication server compares the one-time template (p) received from the client or the terminal with a prestored one-time registration template (g). When the comparison value or the matching score is smaller than a predetermined value, the authentication system or the authentication server determines an authenticated user as a genuine. On the other hand, when the comparison value or the matching score is larger than the predetermined value, the authentication system or the authentication server determines the authenticated user as an imposter. Herein, it should be noticed that the authentication system or the authentication server performs authentication without the original template (x), the original template (y), the random orthogonal matrix (A) and the random vector (b). As shown in the Equation (4), it can be seen that the comparison value or the matching score between the one-time registration template (g) and the one-time authentication template (p), i.e., Euclidean distance is the same as the comparison value between the original template (x) and the original template (y). That is, although an original template is transformed according to the present invention for protecting a user's original template, it can be seen that the comparison value or the matching score is the same before and after transformation for a valid user. Accordingly, although the transformed one-time registration template (g) and the transformed tone-time authentication template (p) are used for the protection of an original template, it can be seen that user authentication can be proved without disclosing the original biometric information of a user.

$$\begin{aligned}\|g-p\|^2 &= (g-p)^T(g-p) \\ &= (Ax+b-Ay-b)^T(Ax+b-Ay-b) \\ &= (Ax-Ay)^T(Ax-Ay) \\ &= (x-y)^T A^T A(x-y) \\ &= \|x-y\|^2\end{aligned} \qquad (4)$$

Assumed that the one-time authentication template (p) is generated using a false random orthogonal matrix (A') and a false random vector (b') which are not the random orthogonal matrix (A) and the random vector (b) used for the generation of the one-time registration template (g), it can easily be seen that the equal relationships of the Equation (4) are not achieved, and Euclidean distance between the one-time registration template (g) and the one-time authentication template (p) becomes larger than Euclidean distance between the original template (x) and the original template (y) because the random orthogonal matrix (A) is inconsistent with the false random orthogonal matrix (A') and the random vector (b) is inconsistent with the false random vector (b'). That is, to authenticate as a valid user, the accurate random orthogonal matrix (A) and the accurate random vector (b) must be provided together with a user's biometric data. Although the random orthogonal matrix (A) and the random vector (b) are stolen, an impostor acquiring the stolen random orthogonal matrix (A) and the stolen random vector (b) must still provide a valid original biometric template (which is a template capable of proving a user as a genuine in a biometric system which dose not adopt a transform scheme with the random orthogonal matrix (A) and the random vector (b), in other words whose Euclidean distance from the original enrolled template (g) is less than a predetermined value) for authentication system or authentication server to allow authentication as a right user. Accordingly, in a case where a method according to the present invention is applied to the conventional biometric system, a false rejection rate for a valid user is not affected, and a false acceptance rate for an impostor can be reduced.

Although the original template (x) is transformed into the one-time authentication template (p) to be transmitted, a template stolen in the middle of transmitting can be used for replay attack. To prevent this, a method using different forms of a one-time authentication template and a one-time registration template upon every authentication will be described as a biometric authentication method according to an embodiment of the present invention.

Upon t-th authentication, it is assumed that the authentication server stores a one-time registration template ($g_t$) and a one-time transform key ($K_t$) as a secret number, and a user has one-time transform information ($A_t$) and ($b_t$) and a one-time transform key ($K_t$). The one-time transform information ($A_t$) and ($b_t$) and the one-time transform key ($K_t$) may be stored as the secret information of the user in a personal storage device such as a smart card. Upon the t-th authentication, the user generates a t-th one-time authentication template $p_t$ using its own biometric information and the one-time transform information ($A_t$) and ($b_t$) as expressed in Equation (5) below.

$$P_t = A_t y + b_t \qquad (5)$$

The client transmits the one-time authentication template ($p_t$) to the authentication server. The authentication server receives the one-time authentication template ($p_t$) and compares the received one-time authentication template ($p_t$) with the one-time registration template ($g_t$) which is prestored in the authentication server to perform user authentication.

When the t-th authentication is successfully achieved, the authentication server generates a new random orthogonal matrix ($A'_t$) and a new random vector ($b'_t$) using the one-time transform key ($K_t$). Furthermore, the authentication server updates a t-th one-time registration template ($g_t$) using the random orthogonal matrix ($A'_t$) and the random vector ($b'_t$). That is, the t-th one-time registration template ($g_t$) is updated into a (t+1)-th one-time registration template ($g_{t+1}$) as expressed in Equation (6) below.

$$g_{t+1} = A'_t g_t + b'_t \qquad (6)$$

The initial transformed one-time registration template ($g_0$) is generated upon initial registration of the user as described above with reference to the Equation (2), and the initial random orthogonal matrix ($A_0$) and the initial random vector ($b_0$) must be generated independently of an initial one-time transform key ($K_0$). Although the one-time registration template ($g_t$) and the one-time transform key ($K_t$) are stolen from the authentication system or the authentication server, a one-time registration template ($g_{t-1}$) preceding the one-time registration template ($g_t$) cannot be derived, and thus the original template (x) cannot be derived either.

After checking authentication, the user updates the one-time transform information ($A_t$) and ($b_t$) for successive (t+1)-th authentication through the client or the terminal. That is, as expressed Equation (7) below, the one-time transform information ($A_t$) and ($b_t$) are updated into new one-time transform information ($A_{t+1}$) and ($b_{t+1}$), and the updated one-time transform information ($A_{t+1}$) and ($b_{t+1}$) are stored in a personal storage device.

$$A_{t+1} = A'_t A_t$$

$$b_{t+1} = A'_t b_t + b'_t \qquad (7)$$

Since the multiplication of two orthogonal matrixes becomes an orthogonal matrix, although a transform function is continuously applied, a comparison value or a matching score before the transformation of a template is kept the same as a comparison value or a matching score after the transformation of a template as described above.

The random orthogonal matrix ($A'_t$) and the random vector ($b'_t$) are generated from the one-time transform key ($K_t$). A set of random numbers is generated from the random number generator using the one-time transform key ($K_t$) as a state number, and thereafter the orthogonal matrix ($A'_t$) and the random vector ($b'_t$) having a suitable size are generated via a normalization process. Since the same set of random numbers can be generated with the same state number, the authentication server and the client can respectively generate the random orthogonal matrix (A'$_t$) and the random vector (b'$_t$) on the basis of the one-time transform key (K$_t$) independently of each other.

TABLE 1

1. A user transmits a one-time authentication template (p$_t$) to an authentication server.
2. An authentication server performs user authentication using a one-time registration template (g$_t$) and a one-time authentication template (p$_t$). When a authenticated user is determined as a genuine, the authentication server transmits a random key (R$_t$) and a check key (H(K$_t$∥R$_t$)) to the user. Furthermore, the authentication server updates the one-time registration template (g$_t$) using a one-time transform key (K$_t$), and updates the one-time transform key (K$_t$) with a one-time transform key (H(K$_{t+1}$ ⊕ R$_t$)).
3. A user checks the validity of a check key a random key (R$_t$) using a check key (H(K$_t$∥R$_t$)), updates a one-time transform information (A$_t$) and (b$_t$) using a one-time transform key (K$_t$), and updates the one-time transform key (K$_t$) with a one-time transform key (H(K$_{t+1}$ ⊕ R$_t$)).

The Table 1 is the communication protocol between the client and the authentication. In the Table 1, the random key (R$_t$) represents a random number which is randomly generated in the authentication system or the authentication server, H( ) represents a hash function, ∥ represents a concatenation, and ⊕ represents exclusive OR. The random key (R$_t$) is used for generating the one-time transform key (K$_{t+1}$), and the authentication server transmits both the random key (R$_t$) and the check key (H(K$_t$∥R$_t$)) to the client. H(K$_t$∥R$_t$) is a check key for checking whether the random key (R$_t$) transmitted to the client from the authentication server is valid. The client checks the validity of the random key (R$_t$) transmitted from the authentication server using the check key (H(K$_t$∥R$_t$)) and updates the one-time transform key (K$_t$) into the one-time transform key (K$_{t+1}$). Since the one-time transform key (K$_t$) is updated using the hash function, it is impossible to derive the previous one-time transform key (K$_{t-1}$) from the current one-time transform key (K$_t$) in computation. Moreover, it is also impossible to derive the original template (y), a preceding one-time authentication template (p$_{t-1}$) and a successive one-time authentication template (p$_{t+1}$) using the random key (R$_t$), the check key (H(K$_t$∥R$_t$)) and the one-time authentication template (p$_t$) which are stolen in the middle of being transmitted. Accordingly, although the random key (R$_t$), the check key (H(K$_t$∥R$_t$)) and the one-time authentication template (p$_t$) are stolen in the middle of being transmitted over a network, it is impossible to obtain an illegal access to the authentication sever using the stolen information.

FIGS. 1 to 4 illustrate an experimental result for user authentication performed with a face photograph of a user for proving validity of a principle according to embodiments of the present invention. A face photo is used in an experiment, but the present invention is not limited to face recognition. For an experiment, a 64 pixel by 64 pixel black-and-white face picture was used. A face database was composed of twenty front face photos per one person to total fifty-five persons. A 4,096-dimensional vector was generated for each face picture by arranging pixels of a 64 pixel by 64 pixel picture in order, and thereafter a 120-dimensional feature was extracted via principal component analysis. To generate a basis vector for the extraction of a feature, ten photos per each person were selected and used. Furthermore, an average of each ten photos used for the generation of the basis vector was calculated, the calculated average was used as a registration template, and remaining ten photos per each person were used as a test, i.e., an authentication template. Detail contents for a face feature extraction and recognition scheme using principal component analysis refer to Face Recognition Using Eigenface (A. Turk and A. P. Petland. In Proc. of IEEE Conf. on Computer Vision and Pattern Recognition, Maui, Hi., July 1991).

Figure 1:
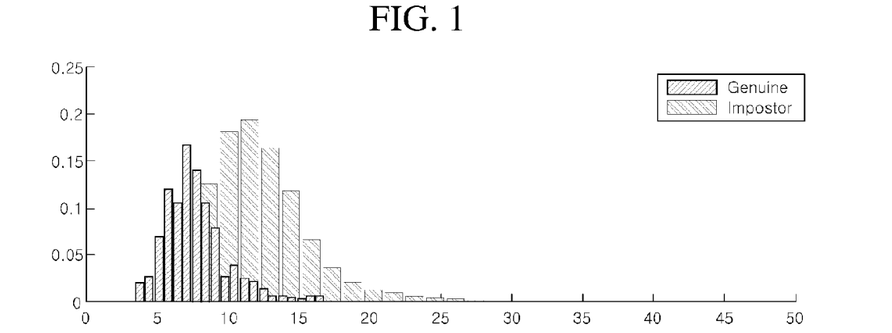
FIG. 1 is a graph illustrating a result of an authentication experiment for face features extracted using principal component analysis in a method for generating a one-time biometric template according to an embodiment of the present invention.

FIG. 1 illustrates a result of an authentication experiment for face features extracted using principal component analysis. FIG. 1 illustrates a genuine distribution and an impostor distribution. The genuine distribution is a comparison value or a matching score distribution generated by comparing a registration template of a user with an authentication template of the same user, and the impostor distribution is a comparison value distribution generated by comparing a registration template of a user with an authentication template of other user. Since Euclidean distance was used as a comparison value or a matching score, the genuine distribution generally has a value smaller than that of the impostor distribution. In FIG. 1, an equal error rate is 18.18%. FIG. 1 illustrates a result of an experiment using an original template.

Figure 2:
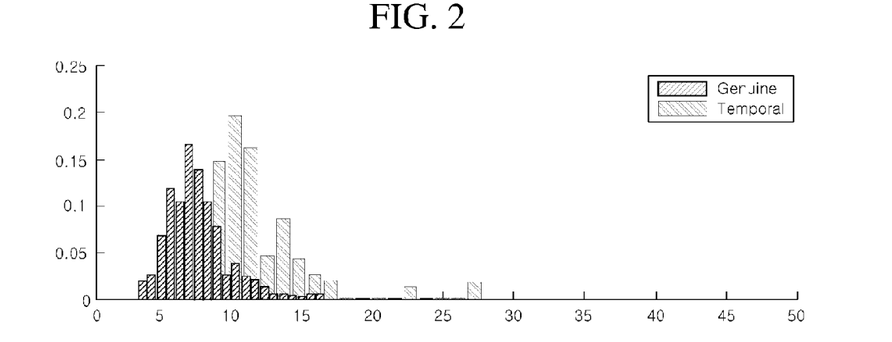
FIG. 2 is a graph illustrating a result of an authentication experiment in which a transform function of the related art is applied to a method for generating a one-time template according to an embodiment of the present invention.

FIG. 2 illustrates a result of an authentication experiment in which a transform function is applied to a method for generating a one-time template according to an embodiment of the present invention, wherein the transform function was proposed in Two Factor Authentication Scheme with Cancelable Feature (J. kang, D. Nyang, and K. Lee., In IWBRS, LNCS 3781, pages 67-76, 2005). The reference proposed a transform function for the protection of a template as a scheme of rearranging the order of elements of an original template using a random permutation matrix. FIG. 2 illustrates a result of a user authentication experiment using the random permutation matrix proposed in the reference instead of using a transform method according to the present invention. In FIG. 2, a genuine distribution is a comparison value or a matching score distribution generated by comparing a one-time registration template of a user with a one-time authentication template of the same user, and a temporal distribution is a comparison value distribution between the one-time registration template (g$_t$) and the preceding one-time registration template (g$_{t-1}$). In FIG. 2, an equal error rate is 24.35%. That is, a temporal distribution is an experimental result for determining whether a template stolen in the middle of being transmitted over a network can be used next time. As seen via the equal error rate, it can be seen that an overlapping portion between an overlapping portion between the genuine distribution and temporal distribution of FIG. 2 is larger than the genuine distribution and impostor distribution of FIG. 1. This represents that the one-time registration template (g$_t$) is similar to the one-time registration template (g$_{t-1}$) and that the one-time authentication template (p$_{t-1}$) used in the (t−1)-th authentication can be used in the t-th authentication. In other words, if the one-time authentication template (p$_{t-1}$) is similar to the one-time registration template (g$_{t-1}$) and the one-time registration template (g$_t$) is similar to the one-time registration template (g$_{t-1}$), there is very much possibility that the one-time authentication template (p$_{t-1}$) is similar to the one-time registration template (g$_t$), and user authentication can be achieved using the one-time authentication template (p$_{t-1}$) at the point where the one-time registration template (g$_t$) is stored in the authentication server or the authentication system. Accordingly, this represents that an authenticated user can be authenticated as a valid user next time using a template stolen in the middle of being transmitted over the network.

Figure 3:
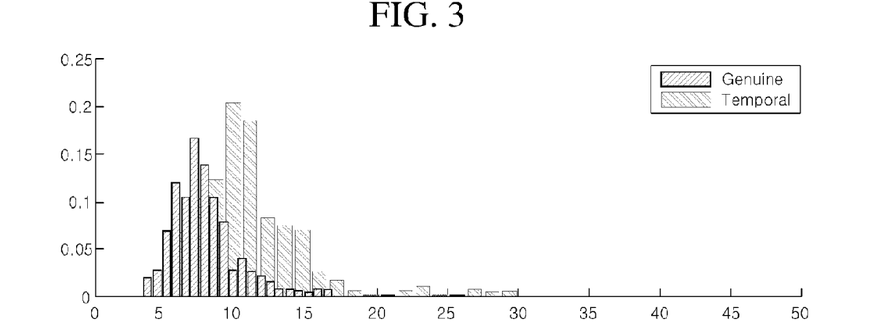
FIG. 3 is a graph illustrating a result of an authentication experiment for face features extracted using only a random orthogonal matrix in a method for generating a one-time biometric template according to an embodiment of the present invention.

FIG. 3 is a graph illustrating a result of an authentication experiment for face features extracted using only a random orthogonal matrix in a method for generating a one-time bio-recognition template according to an embodiment of the present invention. In FIG. 3, a genuine distribution is a comparison value or a matching score distribution generated by comparing a one-time registration template of a user with a one-time authentication template of the same user, and a temporal distribution is a comparison value or a matching score distribution between the one-time registration template ($g_t$) and the preceding one-time registration template ($g_{t-1}$). In FIG. 3, an equal error rate is 24.73%. Similarly to FIG. 2, since an overlapping portion between a genuine distribution and a temporal distribution is large in FIG. 3, FIG. 3 represents that an impostor can be authenticated as a valid user using a stolen template.

Figure 4:
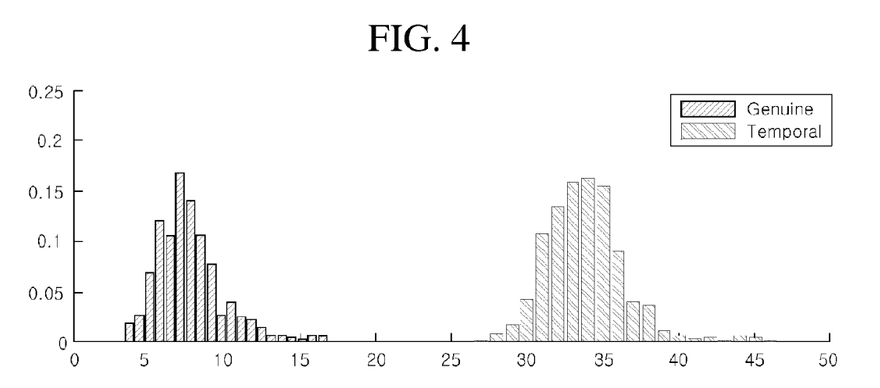
FIG. 4 is a graph illustrating a result of an authentication experiment for a method for generating a one-time template using a random orthogonal matrix and a random vector according to an embodiment of the present invention.

FIG. 4 is a graph illustrating a result of an authentication experiment for a method for generating a one-time template using a random orthogonal matrix and a random vector as one-time transform information according to an embodiment of the present invention. In FIG. 4, a genuine distribution is a comparison value distribution generated by comparing a one-time registration template of a user with a one-time authentication template of the same user, and a temporal distribution is a comparison value distribution between the one-time registration template ($g_t$) and the preceding one-time registration template ($g_{t-1}$). It can be seen from FIG. 4 that the genuine distribution and the temporal distribution are not overlapped with each other and is separated from each other. Therefore, in a case where a template transform method according to an embodiment of the present invention is applied, it can be seen that different templates are generated every time. That is, although a one-time authentication template is stolen in the middle of being transmitted over a network, it can be seen that an impostor user is not authenticated as a valid user next time using the stolen authentication template.

There exists a difference between the experimental results of FIG. 2 and FIG. 3 and the experimental result of FIG. 4, reason of which is as follows. The values of the row vectors or column vectors of a permutation matrix and an orthogonal matrix are 1. Accordingly, the difference or distance between different permutation matrix and orthogonal matrix is relatively less than a variance of a genuine distribution. However, since a value of the random vector (b) is not limited, the random vector (b) can be generated using a random number having a sufficiently large variance. Accordingly, in a case where the permutation matrix or the orthogonal matrix is only used, an alternate form of a template is not generated from a preceding template to be surely classified as an impostor, and thus it can be seen that the random vector (b) plays a more important role in the generation of a one-time template than the random orthogonal matrix.

The preceding embodiments have described on a case where Euclidean distance is used as a comparison value. The principle of the present invention can also be applied to a case where a cosine function is used as the comparison value using the same principle. The Euclidean distance is that the straight distance between two vectors is measured, and is used as dissimilarity representing how much the two vectors differ. On the other hand, the cosine function is used as similarity representing how much the two vectors are similar via the measurement of the angle between the two vectors. As the Euclidean distance between the two vectors increases, the two vectors are dissimilar to each other. As the cosine value between the two vectors increase, the two vectors are similar to each other.

A transform scheme for template protection on a case where the cosine function is used as a comparison measure and a one-time template generation scheme using the same will be described below. An omitted description refers to a description on a case where the preceding Euclidean distance is used as a comparison value.

The one-time registration template (g) transformed from the original template is generated using Equation (8) below.

$$g=Ax \quad (8)$$

The one-time authentication template (p) transformed from the original template is generated using Equation (9) below.

$$p=Ay \quad (9)$$

Similarly to a case where the Euclidean distance is used as the comparison measure, A in the Equations (8) and (9) is the random orthogonal matrix, and A is stored in a personal storage device such as a smart card as the secret information of a user.

As expressed in Equation (10) below, it can be seen that the comparison value between the one-time registration template (g) and the one-time authentication template (p), i.e., a cosine value is the same as a comparison value between the original template (x) and the original template (y). That is, it can be seen that the same comparison and recognition as those before transformation is possible even in a state where a template is transformed.

$$\cos(g, p) = \frac{g \cdot p}{\|g\|\|p\|} \quad (10)$$
$$= \frac{x^T A^T A y}{\sqrt{x^T A^T A x} \sqrt{y^T A^T A y}}$$
$$= \frac{x^T y}{\sqrt{x^T x} \sqrt{y^T y}}$$
$$= \frac{x \cdot y}{\|x\|\|y\|}$$
$$= \cos(x, y)$$

Similarly to the preceding description, it is assumed that the authentication server stores the one-time registration template ($g_t$) and the one-time transform key ($K_t$) being a secret number and a user has the one-time transform information ($A_t$) and the one-time transform key ($K_t$), upon t-th authentication. The one-time transform information ($A_t$) and the one-time transform key ($K_t$) are stored in a personal storage device such as a smart card as the secret information of the user. Upon the t-th authentication, the user generates a t-th probe ($p_t$) using its own bio-information and the one-time transform information ($A_t$) as expressed in Equation (11) below.

$$p_t=A_t y \quad (11)$$

The client or the terminal transmits the t-th probe ($p_t$) to the authentication server, and the authentication server receives the t-th probe ($p_t$). The authentication server compares the t-th probe ($p_t$) with the one-time registration template ($g_t$) to perform user authentication.

If the t-th authentication is successfully achieved, the authentication server generates a new random orthogonal matrix ($A'_t$) using the one-time transform key ($K_t$). Furthermore, the authentication server updates the t-th one-time registration template ($g_t$) into a (t+1)-th one-time registration template ($g_{t+1}$) using the random orthogonal matrix ($A'_t$) as expressed in Equation (12) below, and stores the updated one-time registration template ($g_{t+1}$).

$$g_{t+1}=A'_t g_t \quad (12)$$

The initial transformed one-time registration template (g) is generated upon the initial registration of a user as described above with reference to the Equation (8), and must be generated using the random orthogonal matrix (A) generated independently of the initial one-time transform key (K). Although the one-time registration template ($g_t$) and the one-time transform key ($K_t$) are stolen from the authentication system or the authentication server, a preceding gallery ($g_{t-1}$) cannot be derived, and thus the original template (x) cannot also be derived.

After checking authentication, a user generates the random orthogonal matrix ($A'_t$) using the one-time transform key ($K_t$), generates a new transform function ($A_{t+1}$) as expressed in Equation (13) below, and stores the generated transform function ($A_{t+1}$) in a personal storage device.

$$A_{t+1}=A'_t A_t \quad (13)$$

In a case where a cosine function is used, a comparison value is determined by the angle between two template vectors, as opposed to the preceding case where the template is compared using the Euclidean distance. When multiplying a vector by an orthogonal matrix, the direction of the vector is changed. Accordingly, in a case where the cosine function is used as a comparison value, a new template can be generated by multiplying a feature vector by a new orthogonal matrix.

The biometric authentication method of the present invention, although a template generated for use authentication is stolen in the middle of being transmitted over a network, can securely protect an original template because information of the original template cannot be derived from the stolen template.

Embodiments of the present invention can perform user authentication via the direct comparison of templates in a state where a transformed template is not decrypted, as opposed to a protection method using the conventional general encryption scheme. Particularly, since embodiments of the present invention keep comparison equivalent before and after transformation of templates, recognition performance does not deteriorate when the present invention is applied to a conventional biometric method and system.

Since embodiments of the present invention generate new bio-recognition template for each user authentication, they disallow user authentication by a method that snatches in the middle of transmitting a template over a network and stores/reuses the snatched template, thereby preventing hacking.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all transforms and modifications that fall within the metes and bounds of the claims, or equivalents of such metes and bounds are therefore intended to be embraced by the appended claims. For example, it would easily be understood to those skilled in the art that embodiments of the present invention may be implemented in a system to which the method of the present invention is applied, may be implemented as an apparatus performing the method of the present invention or a system including the apparatus, and may be implemented as various forms such as storage medium recording a program for realizing the method of the present invention.

What is claimed is:

1. A biometric authentication method performed at a client, comprising:
   generating a first one-time authentication template from biometric information of a user using one-time transform information received from the user;
   requesting authentication of the first one-time authentication template from a server;
   receiving a status of the authentication generated by the server by comparing the first one-time authentication template with a one-time registration template stored at the server; and
   if the status of the authentication indicates that the authentication is successful:
     updating the one-time transform information using a first one-time transform key that is equal to a second one-time transform key used by the server to update the one-time registration template stored at the server;
     updating the first one-time transform key using a first random key that is equal to a second random key used by the server to update the second one-time transform key; and
     storing the updated one-time transform information, and the updated first one-time transform key at the client for use when the client next requests authentication from the server.

2. The biometric authentication method of claim 1, wherein the generating of the first one-time authentication template and the requesting of the authentication comprises:
   generating an original template from the biometric information; and
   transforming the original template into the first one-time authentication template using a first random orthogonal matrix and a first random vector,
   wherein the one-time transform information comprises the first random orthogonal matrix and the first random vector.

3. The biometric authentication method of claim 2, wherein the transforming of the original template comprises:
   multiplying the original template by the first random orthogonal matrix; and
   adding the first random vector to a result of the multiplication.

4. The biometric authentication method of claim 2, wherein the updating of the one-time transform information comprises:
   generating a second random orthogonal matrix and a second random vector using the first one-time transform key; and
   updating the first random orthogonal matrix and the first random vector using the second random orthogonal matrix and the second random vector.

5. The biometric authentication method of claim 4, wherein the updating of the first random orthogonal matrix and the first random vector comprises transforming according to the following equation, $$A_{t+1}=A'_t A_t$$

$$b_{t+1}=A'_t b_t + b'_t$$

where $A_{t+1}$ is an updated first random orthogonal matrix, $A'_t$ is a second random orthogonal matrix, $A_t$ is a first random orthogonal matrix before update, $b_{t+1}$ is an updated first random vector, $b'_t$ is a second random vector, and $b_t$ is a first random vector before update.

6. The biometric authentication method of claim 1, wherein the first one-time authentication template and the one-time registration template are a real vector.

7. A biometric authentication method performed at a client, comprising:
   generating an original template from biometric information of a user;

transforming the original template into a first one-time authentication template using a random orthogonal matrix and a random vector provided from the user;
requesting authentication of the first one-time authentication template from a server;
receiving a status of the authentication generated by the server by comparing the first one-time authentication template with a one-time registration template pre-stored at the server; and
if the status of the authentication indicates that the authentication is successful:
 updating the random orthogonal matrix and the random vector using a first one-time transform key that is equal to a second one-time transform key used by the server to update the one-time registration template;
 updating the first one-time transform key using a first random key that is equal to a second random key used by the server to update the second one-time transform key; and
 storing the updated random orthogonal matrix, the updated random vector, and the updated first one-time transform key at the client for use when the client next requests authentication from the server.

8. The biometric authentication method of claim 7, wherein the generating of the first one-time authentication template comprises deleting the original template.

9. The biometric authentication method of claim 7, wherein
the updating of the first one-time transform key comprises transforming with the first random key according to the following equation, $$Kt+1=H(Kt \oplus Rt)$$

where Kt+1 is the updated first and second one-time transform keys, Kt is the first and second one-time transform keys before update, Rt is the first and second random keys, H( ) is a hash function, and $\oplus$ is exclusive OR.

10. The biometric authentication method of claim 9, further comprising:
providing a check key for checking whether the first random key is a key provided from the server; and
checking whether the first random key is a key provided from the server using the check key and the first random key.

11. A biometric authentication method performed at a server, comprising:
receiving a first one-time authentication template from a client which generates the first one-time authentication template from biometric information of a user using one-time transform information received from the user and which requests authentication of the first one-time authentication template from the server;
generating a status of the authentication by comparing the first one-time authentication template with a one-time registration template which is stored at the server and which is generated by the client by transforming an original template using the one-time transform information received from the user;
transmitting the status of the authentication to the client; and
if the status of the authentication indicates that the authentication is successful:
 updating the one-time registration template using a second one-time transform key that is equal to a first one-time transform key used by the client to update the one-time transform information;
 updating the second one-time transform key using a second random key that is equal to a first random key used by the client to update the first one-time transform key; and
 storing the updated one-time registration template and the updated second one-time transform key at the server for use when the client next requests authentication from the server.

12. The biometric authentication method of claim 11, wherein the updating of the one-time registration template comprises:
generating a random orthogonal matrix and a random vector using a the second one-time transform key; and
updating the one-time registration template using the random orthogonal matrix and the random vector.

13. The biometric authentication method of claim 12, wherein the updating of the one-time registration template comprises:
multiplying the one-time registration by the random orthogonal matrix; and
adding the random vector to a result of the multiplication.

14. The biometric authentication method of claim 11, wherein the first one-time authentication template and the one-time registration template are a real vector.

15. A biometric authentication method performed at a server, comprising:
receiving a first one-time authentication template from a client which generates the first one-time authentication template from biometric information of a user using a random orthogonal matrix and a random vector received from the user and which requests authentication of the first one-time authentication template from the server;
generating a status of the authentication by comparing the first one-time authentication template with a one-time registration template which is stored at the server and which is generated by the client by transforming an original template using the random orthogonal matrix and the random vector received from the user;
transmitting the status of the authentication to the client; and
if the status of the authentication indicates that the authentication is successful:
 updating the one-time registration template using a second one-time transform key that is equal to a first one-time transform key used by the client to update the random orthogonal matrix and the random vector;
 updating the second one-time transform key using a second random key that is equal to a first random key used by the client to update the first one-time transform key; and
 storing the updated one-time registration template and the updated second one-time transform key at the server for use when the client next requests authentication from the server.

16. The biometric authentication method of claim 15, wherein the updating of the one-time registration template comprises:
generating a second random orthogonal matrix and a second random vector using the second one-time transform key;
updating the one-time registration template using the second random orthogonal matrix and the second random vector; and
deleting the second random orthogonal matrix and the second random vector.

17. The biometric authentication method of claim 15, wherein the updating of the second one-time transform key comprises transforming with the second random key according to the following equation, $$Kt+1=H(Kt \oplus Rt)$$

where Kt+1 is the updated first and second one-time transform keys, Kt is the first and second one-time transform keys before update, Rt is the first and second random keys, H( ) is a hash function, and $\oplus$ is exclusive OR.

18. The biometric authentication method of claim 17, further comprising:
    at the server, generating the first random key;
    at the server, providing the first random key to the client.

19. The biometric authentication method of claim 18, wherein the check key is generated through H(Kt||Rt), wherein || is concatenation.

* * * * *